(12) United States Patent
Lee et al.

(10) Patent No.: US 12,307,045 B2
(45) Date of Patent: May 20, 2025

(54) ELECTRONIC DEVICE IDENTIFYING FORCE TOUCH AND METHOD FOR OPERATING THE SAME

(71) Applicant: SAMSUNG ELECTRONICS CO., LTD., Suwon-si (KR)

(72) Inventors: Junhyuk Lee, Suwon-si (KR); Hyunbin Park, Suwon-si (KR); Seungjin Yang, Suwon-si (KR); Jin Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/414,453

(22) Filed: Jan. 16, 2024

(65) Prior Publication Data
US 2024/0152234 A1 May 9, 2024

Related U.S. Application Data

(63) Continuation of application No. 17/899,138, filed on Aug. 30, 2022, now Pat. No. 11,874,995, which is a
(Continued)

(30) Foreign Application Priority Data
Sep. 30, 2021 (KR) .......................... 10-2021-0130009

(51) Int. Cl.
G06F 3/041 (2006.01)
G06N 3/045 (2023.01)

(52) U.S. Cl.
CPC ........... G06F 3/0418 (2013.01); G06N 3/045 (2023.01)

(58) Field of Classification Search
CPC ......... G06F 2203/04106; G06F 3/0414; G06F 3/04166
See application file for complete search history.

(56) References Cited

U.S. PATENT DOCUMENTS 10,685,059 B2   6/2020  Kim et al.
11,520,439 B1  12/2022  Ciotirca et al.
(Continued)

FOREIGN PATENT DOCUMENTS

CN    111309145 A    6/2020
JP    2021081817 A    5/2021
(Continued)

OTHER PUBLICATIONS

Boceck, Tobias et al. Force Touch Detection on Capacitive Sensors using Deep Neural Networks, MOBILE HCI '19: Proceedings of the 21st International Conference on Human-Computer Interaction with Mobile Devices and Services, Article No., pp. 1-6, Oct. 1, 2019.
(Continued)

Primary Examiner — Van N Chow
(74) Attorney, Agent, or Firm — CANTOR COLBURN LLP

(57) ABSTRACT

According to various embodiments, an electronic device includes a memory storing deep learning models for determining a force touch, a touchscreen, and a processor configured to identify a touch input of a user through the touchscreen, receive touch pixel data for frames having a time difference based on the touch input, and identify whether the touch input is a force touch based on the touch pixel data. The processor is configured to identify whether the touch input is the force touch using a first determination model among the deep learning models in response to identifying that the touch input is reinputted a designated first number of times or more within a designated time, and otherwise, identify whether the touch input is the force touch
(Continued)

using a determination model having a lower computation load than the first determination model among the deep learning models.

20 Claims, 10 Drawing Sheets

Related U.S. Application Data continuation of application No. PCT/KR2022/012978, filed on Aug. 30, 2022.

(56) References Cited

U.S. PATENT DOCUMENTS

| | | |
|---|---|---|
| 2010/0225604 A1 | 9/2010 | Homma et al. |
| 2012/0105358 A1 | 5/2012 | Momeyer et al. |
| 2012/0229407 A1 | 9/2012 | Harris et al. |
| 2013/0018489 A1 | 1/2013 | Grunthaner et al. |
| 2015/0242009 A1 | 8/2015 | Xiao et al. |
| 2017/0010732 A1 | 1/2017 | Bosch Ruiz et al. |
| 2017/0024074 A1 | 1/2017 | Forlines et al. |
| 2017/0116545 A1 | 4/2017 | Johnson et al. |
| 2017/0192602 A1 | 7/2017 | Kim et al. |
| 2017/0220152 A1 | 8/2017 | Han et al. |
| 2018/0239306 A1 | 8/2018 | Ely |
| 2019/0134373 A1 | 5/2019 | Barron et al. |
| 2020/0012382 A1 | 1/2020 | Lee |
| 2020/0133455 A1 | 4/2020 | Sepehr et al. |
| 2021/0117856 A1 | 4/2021 | Vichare et al. |
| 2021/0166271 A1* | 6/2021 | Seok .................. G06Q 30/0242 |
| 2022/0113767 A1 | 4/2022 | Jung et al. |
| 2023/0098019 A1* | 3/2023 | Lee ..................... G06F 3/04886 |
| | | 345/173 |

FOREIGN PATENT DOCUMENTS

| | | |
|---|---|---|
| KR | 20120101359 A | 9/2012 |
| KR | 20130088861 A | 8/2013 |
| KR | 20140023428 A | 2/2014 |
| KR | 20170030613 A | 3/2017 |
| KR | 20180109214 A | 10/2018 |
| KR | 20190104101 A | 9/2019 |
| KR | 20200014510 A | 2/2020 |
| KR | 20200092456 A | 8/2020 |
| KR | 20210069672 A | 6/2021 |

OTHER PUBLICATIONS

International Search Report with English Translation and Written Opinion for International Application No. PCT/KR2022/012978; International Filing Date Aug. 30, 2022; Date of Mailing Nov. 25, 2022; 8 pages.

Liu, Yong et al. Ensemble Learning-Based Technique for Force Classifications in Piezoelectric Touch Panels, IEEE Sensors Journal, vol. 20 No1 16, pp. 9540-9549, Apr. 13, 2020.

\* cited by examiner

ELECTRONIC DEVICE IDENTIFYING FORCE TOUCH AND METHOD FOR OPERATING THE SAME

CROSS-REFERENCE TO RELATED APPLICATION(S)

This application is a continuation application of a PCT-Bypass Continuation of International Patent Application No. PCT/KR2022/012978, filed on Aug. 30, 2022, now U.S. Pat. No. 11,874,995, which claims priority to Korean Patent Application No. 10-2021-0130009, filed on Sep. 30, 2021, and all the benefits accruing therefrom under 35 U.S.C. § 119, the contents of which are hereby incorporated by reference for all purposes as if fully set forth herein.

BACKGROUND

Field

Various embodiments relate to an electronic device identifying a force touch and a method for operating the same.

Description of Related Art

An artificial intelligence (AI) system is a computer system which implements human level intelligence, and this system is self-trained and determines and thus becomes smarter unlike conventional rule-based smart systems. The more used, the more precisely AI systems may perceive and understand users' preference. Thus, legacy rule-based smart systems are being gradually replaced with AI systems that can be deep learning-based.

Artificial intelligence technology may consist of machine learning (e.g., deep learning) and element techniques using machine learning.

Machine learning is an algorithm technique that may classify and learn the features of input data. The component technology is a technique for mimicking the human brain's perception and decision capabilities using a machine learning algorithm (e.g., deep learning), and this may be divided into several technical fields, such as linguistic understanding, visual understanding, inference/prediction, knowledge expression, and operation control.

The following are examples of AI applications. Linguistic understanding is technology for recognizing and applying/processing a human being's language or text, and this encompasses natural language processing, machine translation, dialog system, answering inquiries, and speech recognition/synthesis. Visual understanding is a technique of perceiving and processing things as do human eyes, and this encompasses object recognition, object tracing, image search, human recognition, scene recognition, space understanding, and image enhancement. Inference prediction is a technique of determining and logically inferring and predicting information, encompassing knowledge/probability-based inference, optimization prediction, preference-based planning, and recommendation. Knowledge expression is a technique of automatically processing human experience information, covering knowledge buildup (data production/classification) and knowledge management (data utilization). Operation control is a technique of controlling the motion of robots and driverless car driving, and this encompasses movement control (navigation, collision, driving) and maneuvering control (behavior control).

The growth of electronic technology is leading to the development and spread of various types of electronic devices. Particularly in wide use are portable electronic devices with various functionalities, such as smartphones or tablet personal computers (PCs). To support various functions of such portable electronic devices, the intensity (pressure) of a touch input, as well as the conventional touch input is used as a new input means.

SUMMARY

Conventionally, to identify whether a touch input is a long touch or a force touch, the electronic device identifies the pressure of the touch input applied to the touchscreen using a force touch sensor (or pressure sensor) provided at a lower end of the touchscreen. However, the conventional electronic device may be disadvantageous in terms of costs and product downsizing due to the need for separately having a force touch sensor (or pressure sensor).

Recently introduced is a technique for identifying whether a touch input is a long touch or a force touch by way of deep learning technology without a force touch sensor (or pressure sensor). The deep learning model for determining the force touch may be designed as a model that has a high computation rate for rapid response. However, the high-computation rate deep learning model may suffer from reduced accuracy in force touch determination.

Various embodiments may provide an electronic device that selects an appropriate deep learning model from among a plurality of deep learning models using a history of previous force touch determinations and identifies whether a touch input is a long touch or a force touch through the selected deep learning model and a method for operating the same.

According to various embodiments, an electronic device may comprising a memory configured to store a plurality of deep learning models for determining a force touch, a touchscreen, and a processor configured to identify a touch input of a user through the touchscreen, receive touch pixel data for a plurality of frames having a time difference based on the touch input, and identify whether the touch input is a force touch based on the touch pixel data. The processor may be configured to identify whether the touch input is reinputted a designated first number of times or more within a designated time, if it is identified that the touch input is reinputted the designated first number of times or more within the designated time, identify whether the touch input is the force touch using a first determination model among the plurality of deep learning models, and if it is not identified that the touch input is reinputted the designated first number of times or more within the designated time, identify whether the touch input is the force touch using a determination model having a lower computation load than the first determination model among the plurality of deep learning models.

According to various embodiments, a method for operating an electronic device may comprise identifying a touch input of a user through a touchscreen included in the electronic device, receiving touch pixel data for a plurality of frames having a time difference based on the touch input, and identifying whether the touch input is a force touch based on the touch pixel data. Identifying whether the touch input is the force touch may include identifying whether the touch input is reinputted a designated first number of times or more within a designated time, if it is identified that the touch input is reinputted the designated first number of times or more within the designated time, identifying whether the touch input is the force touch using a first determination model among a plurality of deep learning models stored in a memory included in the electronic device, and if it is not identified that the touch input is reinputted the designated first number of times or more within the designated time, identifying whether the touch input is the force touch using a determination model having a lower computation load than the first determination model among the plurality of deep learning models.

According to various embodiments, a non-transitory recording medium stores instructions configured to be executed by a processor of an electronic device to enable the electronic device to perform identifying a touch input of a user through a touchscreen included in the electronic device, receiving touch pixel data for a plurality of frames having a time difference based on the touch input, and identifying whether the touch input is a force touch based on the touch pixel data. Identifying whether the touch input is the force touch may include identifying whether the touch input is reinputted a designated number of times or more within a designated time, if it is identified that the touch input is reinputted the designated number of times or more within the designated time, identifying whether the touch input is the force touch using a first determination model among a plurality of deep learning models stored in a memory included in the electronic device, and if it is not identified that the touch input is reinputted the designated number of times or more within the designated time, identifying whether the touch input is the force touch using a determination model having a lower computation load than the first determination model among the plurality of deep learning models.

According to various embodiments, the electronic device may select an appropriate deep learning model from among a plurality of deep learning models using a history of previous force touch determinations and enhance the accuracy and response rate of force touch determination.

DETAILED DESCRIPTION

Figure 1:
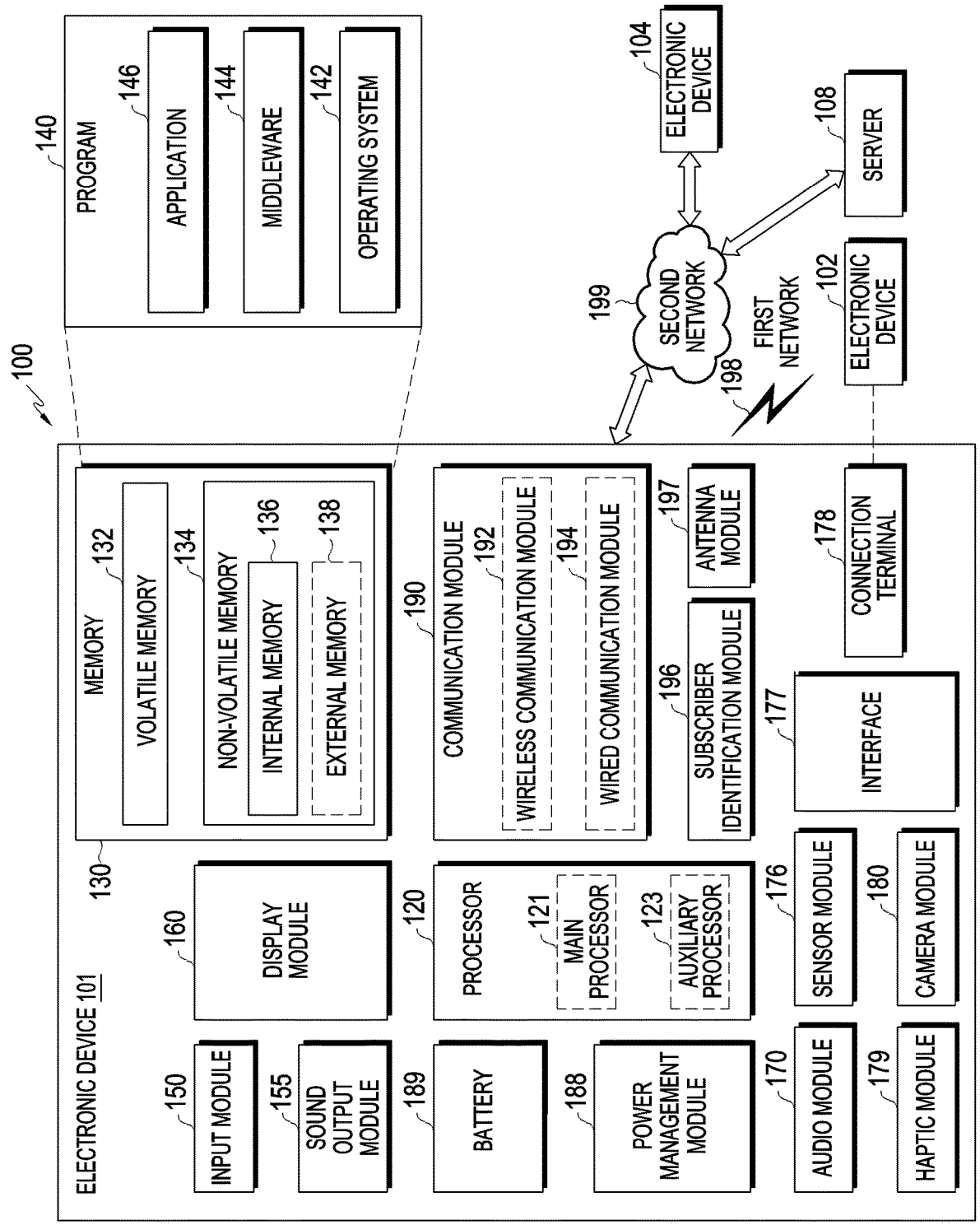
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199

(e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
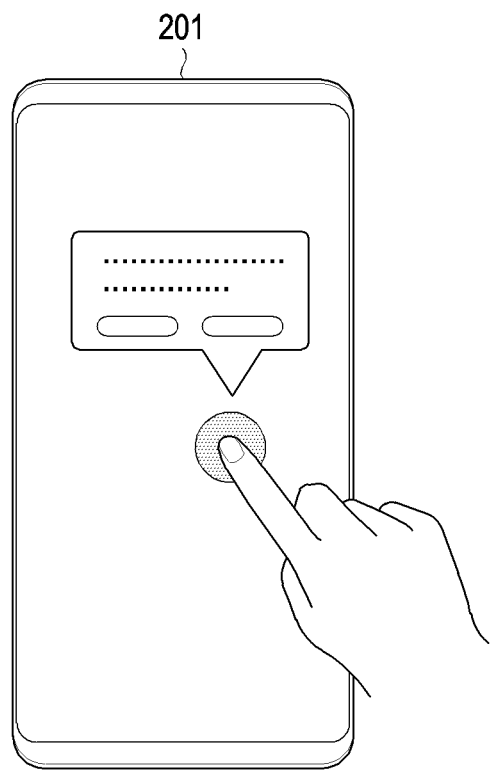
FIGS. 2A and 2B are block diagrams illustrating an electronic device according to various embodiments.
Figure 2B:
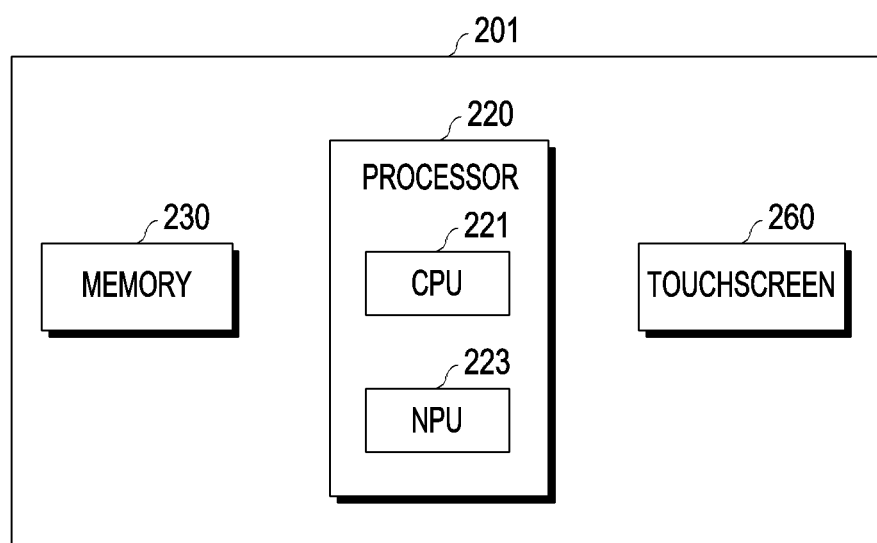

FIGS. 2A and 2B are block diagrams illustrating an electronic device according to various embodiments.

Referring to FIG. 2A, the electronic device 201 may identify the user's touch input. For example, the electronic device 201 may be implemented to be identical or similar to the electronic device 101 of FIG. 1.

According to various embodiments, the electronic device 201 may identify whether the touch input is a long touch (or long touch input) or a force touch (or force touch input). Upon identifying that the touch input is a force touch, the electronic device 201 may perform a function corresponding to the force touch. For example, upon identifying that a touch input to an icon is a force touch, the electronic device 201 may display a first popup window for an application indicated by the icon. Or, upon identifying that the touch input is a long touch, the electronic device 201 may perform a function corresponding to the long touch. For example, upon identifying that the touch input to the icon is a long touch, the electronic device 201 may display a second popup window for the icon. For example, the function corresponding to the force touch may differ from the function corresponding to the long touch. Further, the content of the first popup window and the content of the second popup window may differ from each other.

According to various embodiments, the electronic device 201 may identify (or determine) whether the touch input is a force touch without using a force touch sensor or pressure sensor. For example, the electronic device 201 may identify (or determine) whether the touch input is a force touch using a deep learning model (or a force touch determination model using a deep learning model).

According to various embodiments, the electronic device 201 may select a deep learning model (hereinafter, "determination model") appropriate for the context among a plurality of deep learning models requiring different computation loads and identify whether the touch input is a force touch using the selected determination model. For example, the electronic device 201 may select a determination model considering accuracy and responsiveness and identify whether the touch input is a force touch using the selected determination model.

Referring to FIG. 2B, an electronic device 201 may include a processor 220, a memory 230, and a touchscreen 260.

According to various embodiments, the processor 220 (e.g., the processor 120 of FIG. 1) may control the overall operation of the electronic device 201. The processor 220 can execute a plurality of instructions stored in the memory 230, where the memory 230 can include a non-transitory recording medium storing instructions configured to be executed by the processor 220 of the electronic device 201 to enable the electronic device 201 to perform a plurality of operations. The memory 230 can also store various models, data structures, and applications.

According to various embodiments, the processor 220 may identify the user's touch input through the touchscreen 260 (e.g., the display module 160 of FIG. 1). For example, the touchscreen 260 may include a touch integrated circuit (IC).

According to various embodiments, the processor 220 may receive (or obtain) touch pixel data for a plurality of frames having a time difference based on the touch input through the touchscreen 260 (or the touch IC included in the touchscreen). For example, the touch pixel data may be data for sensing values that are varied over time by the touch input.

According to various embodiments, the processor 220 may perform a force touch determination operation based on the touch pixel data. For example, the force touch determination operation may be an operation of identifying whether the touch input is a long touch or a force touch. For example, the processor 220 may identify whether the touch input is a force touch by entering the touch pixel data, as an input value of the deep learning model (e.g., determination model) for determining the force touch.

According to various embodiments, the memory 230 (e.g., the memory 130 of FIG. 1) may store information about a plurality of deep learning models requiring different computation loads. The plurality of deep learning models may be deep learning models that can distinguish between long touch and force touch based on the touch pixel data sensed by the touch input. For example, the plurality of deep learning models may train the deep learning model that may distinguish between long touch and force touch based on the touch pixel data sensed by the touch input, determining whether the touch input identified through the touchscreen is a force touch.

For example, a deep learning model (e.g., a first determination model) requiring a higher computation load may have a higher accuracy of force touch determination. However, the deep learning model requiring a higher computation load may have slower responsiveness. In contrast, a deep learning model requiring a lower computation load may have lower accuracy of force touch determination. However, the deep learning model requiring a lower computation load may have quicker responsiveness. The memory 230 may store result information (e.g., result of determination, accuracy of determination, and/or number of determination attempts) about the force touch determination identified using the deep learning model.

According to various embodiments, upon identifying a touch input through the touchscreen 260, the processor 220 may determine any one deep learning model (e.g., determination model) for identifying whether the touch input is a force touch among the plurality of deep learning models.

According to various embodiments, the processor 220 may identify whether the touch input is reinputted a designated first number of times (e.g., twice) within a designated time (e.g., 3 seconds). For example, the processor 220 may identify whether the identified touch input is to request force touch determination (or force touch judgement) repeatedly within a designated time. For example, the designated time may be set automatically by the processor 220 or determined by the user. Further, the designated first number of times may also be set automatically by the processor 220 or determined by the user.

According to various embodiments, upon identifying that the touch input is reinputted the designated first number of times within the designated time, the processor 220 may perform the force touch determination operation through a first determination model having a higher computation load (or higher accuracy) among the plurality of deep learning models. For example, the processor 220 may identify whether the touch input is a force touch using the first determination model. Or, upon identifying that the touch input is not reinputted the first number of times within the designated time, the processor 220 may identify whether the touch input is a force touch through a determination model (e.g., second determination model or third determination model) having a lower computation load (or lower accuracy) than the first determination model among the plurality of deep learning models. For example, upon identifying that the touch input is to request force touch determination repeatedly within a designated time, the processor 220 may identify whether the touch input is a force touch or a long touch using a determination model having a higher computation load (or higher accuracy).

According to various embodiments, the processor 220 may divide the display area of the touchscreen 260 into a plurality of areas. For example, the processor 220 may identify a first area, where the touch input is inputted, among the plurality of areas included in the touchscreen 260. The processor 220 may identify the number of times of determination and the accuracy of determination in which it is identified before whether the touch input is a force touch in the first area of the touchscreen 260. The processor 220 may determine a deep learning model (or determination model) for identifying whether the touch input is a force touch among the plurality of deep learning models based on the number of times of determination and the accuracy of determination.

According to various embodiments, if the number of times of determination in which it is identified before whether the touch input is a force touch in the first area where the touch input has been identified of the entire display area (or among the plurality of areas) of the touchscreen 260 is less than a designated second number of times (e.g., 30 times), the processor 220 may perform force touch determination using the second determination model. For example, the second determination model may require a lower computation load than the first determination model. Further, the second determination model may derive a result of determination more rapidly than the first determination model. Or, if the number of times of determination in which it is identified before whether the touch input is a force touch in the first area where the touch input has been identified of the entire display area (or among the plurality of areas) of the touchscreen 260 is not less than the designated second number of times (e.g., 30 times), the processor 220 may perform force touch determination using the third determination model. For example, the third determination model may require a lower computation load than the second determination model. Further, the third determination model may derive a result of determination more rapidly than the second determination model.

According to various embodiments, if the force touch identified before in the first area where the touch input has been identified is less than a threshold (e.g., 80%), the processor 220 may perform the force touch determination operation through the first determination model instead of the second determination model or the third determination model.

According to various embodiments, the processor 220 may include a CPU (or first processing unit) 221 and an NPU (or second processing unit) 223. For example, the NPU 223 may more quickly derive a result of determination at low power as compared with the CPU 221. For example, the processor 220 may drive (e.g., execute) the first determination model and the second determination model on the CPU 221 and drive (e.g., execute) the third determination model on the NPU 223. Or, the processor 220 may drive only the first determination model on the CPU 221 and drive the second determination model and third determination model on the NPU 223. Or, the processor 220 may drive the first determination model, second determination model, and third determination model all on the CPU 221 or the NPU 223.

Thus, the processor 220 may select an efficient deep learning model (or determination model) suitable for the context and perform force touch determination on the user's touch input.

At least some of the operations of the electronic device 201 described below may be performed by the processor 220. In the following description, for convenience of description, it is described that the electronic device 201 performs the operations.

Figure 3:
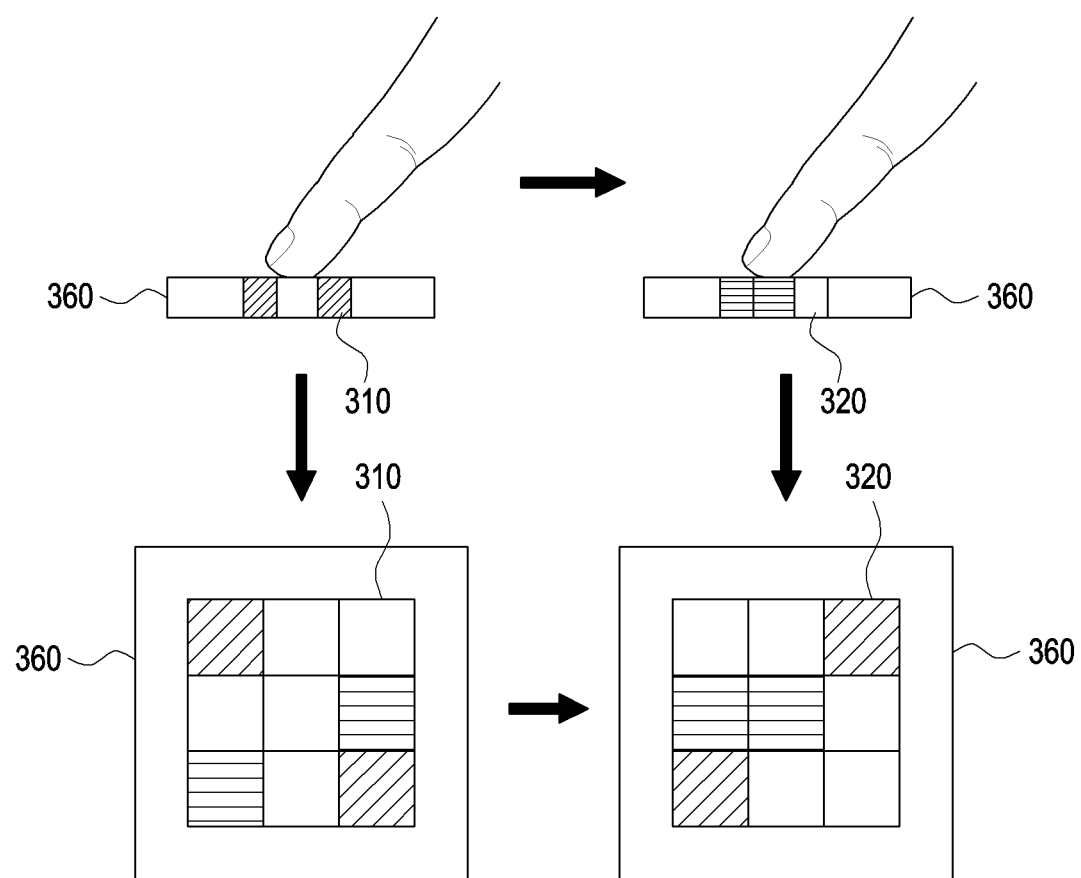
FIG. 3 is a view illustrating an operation of obtaining touch pixel data based on a touch input by an electronic device according to various embodiments.

FIG. 3 is a view illustrating an operation of obtaining touch pixel data based on a touch input by an electronic device according to various embodiments.

Referring to FIG. 3, the electronic device 201 of FIGS. 2A and 2B may include a touchscreen 360 (e.g., the touchscreen 260 of FIG. 2B). For example, the electronic device 201 may sense the user's touch input through the touchscreen 360.

According to various embodiments, the electronic device 201 may obtain touch pixel data for a plurality of frames having a time difference. For example, the electronic device 201 may obtain first touch pixel data 310 corresponding to a first frame at a first time based on the user's touch input. The electronic device 201 may obtain second touch pixel data 320 corresponding to a second frame at a second time after the first time. For example, the electronic device 201 may obtain touch pixel data for a plurality of frames having a time difference by one touch input. The touch pixel data corresponding to the plurality of frames may include the same or different sensing values for a specific pixel.

Figure 4:
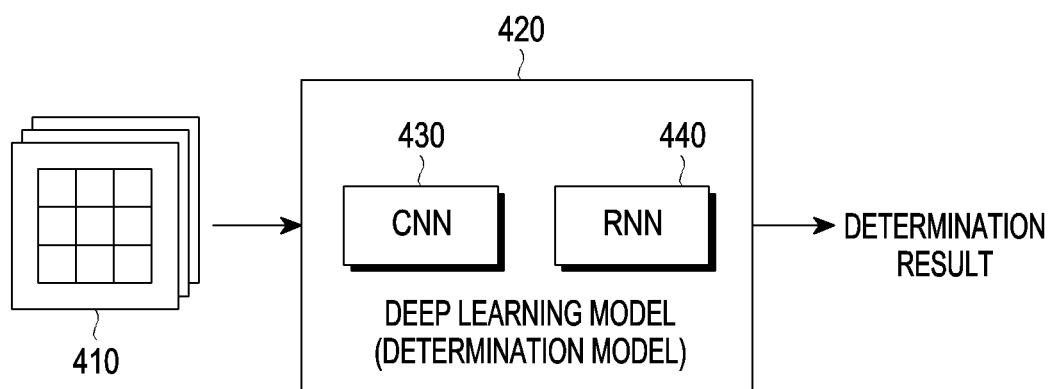
FIG. 4 is a block diagram illustrating a deep learning model identifying a force touch according to various embodiments.

FIG. 4 is a block diagram illustrating a deep learning model identifying a force touch according to various embodiments.

Referring to FIG. 4, according to various embodiments, a deep learning model (or determination model) 420 may include a convolutional neural network (CNN) module 430 and a recurrent neural network (RNN) module 440. The electronic device 201 may perform a force touch determination operation using the deep learning model (or determination model) 420. For example, the deep learning model 420 may identify a touch input from the user's finger and then determine whether the touch input is a force touch before and after 200 ms to 300 ms. For example, the deep learning model 420 may be implemented as a model having quick responsiveness of a 1M byte size. Meanwhile, although FIG. 4 illustrates only the CNN module 430 and RNN module 440, the technical features of the present invention may not be limited thereto. For example, the deep learning model 420 may include a plurality of CNN modules and RNN modules depending on the required computation load.

According to various embodiments, the deep learning model 420 may receive the touch pixel data 410 as an input value. The deep learning model 420 may process the touch pixel data 410 through at least one of the CNN module 430 and the RNN module 440 and output a result of determination indicating whether the touch input is a force touch.

According to various embodiments, the first determination model, second determination model, and third determination model merely differ in computation load but may be implemented to be identical or similar to the deep learning model 420.

Figure 5:
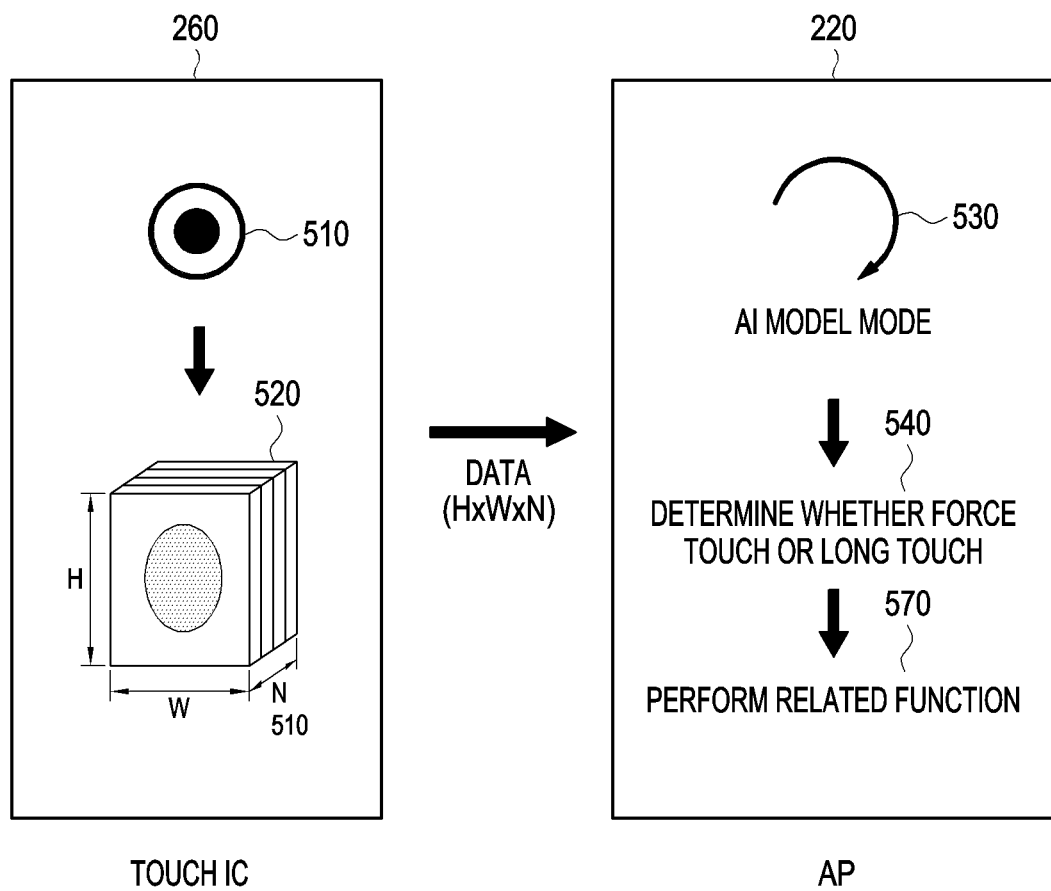
FIG. 5 is a view illustrating an operation of identifying a force touch through a deep learning model by an electronic device according to various embodiments.

FIG. 5 is a view illustrating an operation of identifying a force touch through a deep learning model by an electronic device according to various embodiments.

Referring to FIG. 5, according to various embodiments, in operation 510, the electronic device 201 of FIGS. 2A and 2B may identify the user's touch input through the touchscreen (or touch IC) 260.

According to various embodiments, in operation 520, the electronic device 201 may obtain touch pixel data for a plurality of frames having a time difference based on the touch input through the touchscreen (or touch IC) 260. For example, the touch pixel data may include data having a length H, a width W, and a time N for the touch input. For example, the touch pixel data may include data for frames having pixel values sensed on a vertical axis H and horizontal axis W having a designated size, obtained for a designated time N.

According to various embodiments, the processor 220 may obtain touch pixel data from the touch IC. In operation 530, the processor 220 may load any one deep learning model (or AI model) among a plurality of deep learning models stored in the memory 230. In operation 540, the processor 220 may determine whether the touch input is a force touch or a long touch based on the touch pixel data through the loaded deep learning model (or AI model).

According to various embodiments, in operation 570, the processor 220 may perform a function related to a force touch or a long touch based on the determination result.

Figure 6:
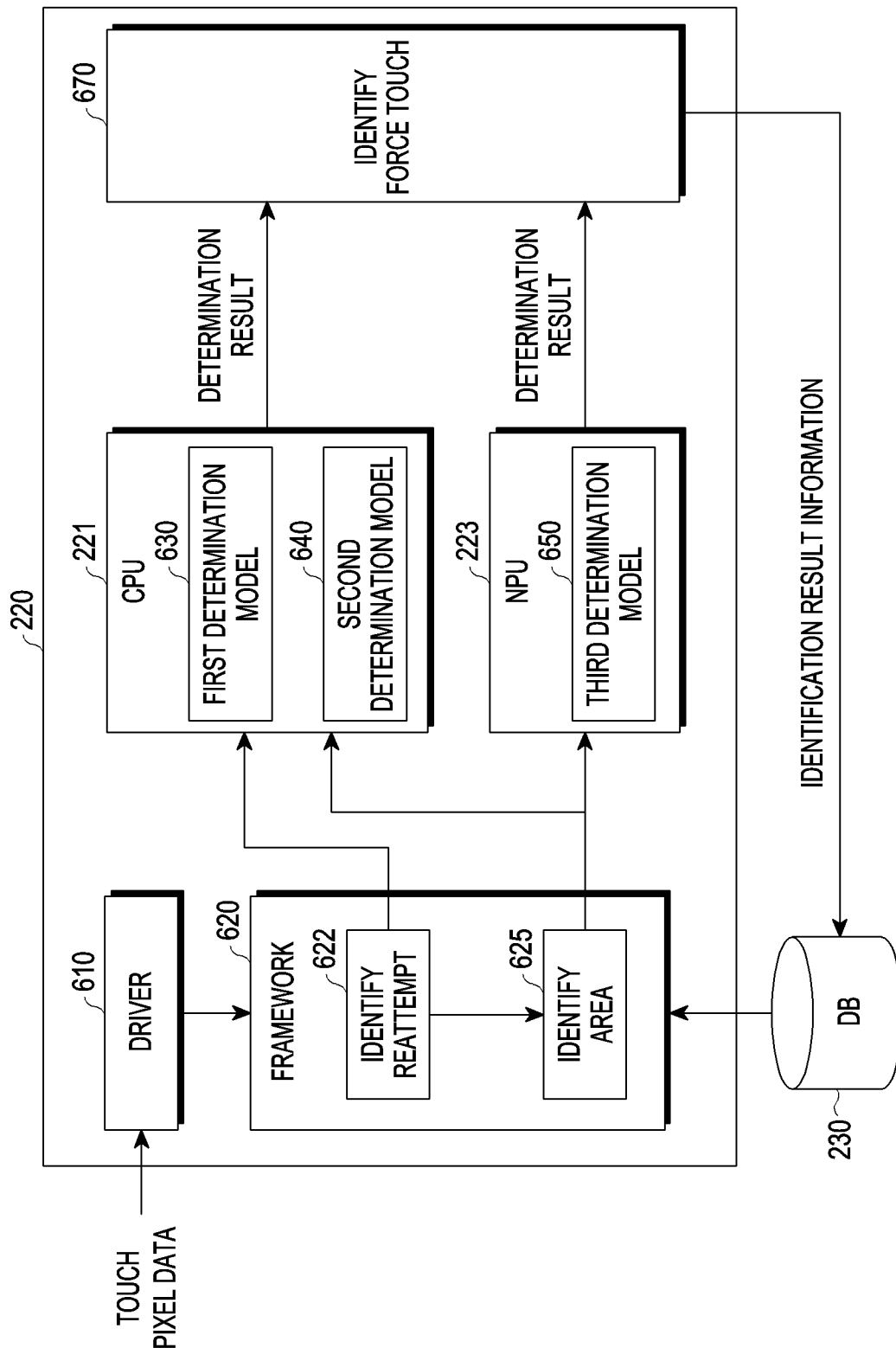
FIG. 6 is a view illustrating an operation of identifying a force touch through a deep learning model by an electronic device according to various embodiments.

FIG. 6 is a view illustrating an operation of identifying a force touch through a deep learning model by an electronic device according to various embodiments.

Referring to FIG. 6, according to various embodiments, a processor 220 may execute a driver 610, a framework 620, a deep learning model (e.g., any one determination model of a first determination model 630, a second determination model 640, and a third determination model 650), and a force touch identification module 670. For example, the first determination model 630 and the second determination model 640 may be driven by a CPU 221. The third determination model 650 may be driven by an NPU 223.

According to various embodiments, the driver 610, the framework 620, and the force touch identification module 670 may be driven by the CPU 221. For example, the driver 610 and the framework 620 may be a driver and a framework of the CPU 221. For example, the driver 610, the framework 620, and the force touch identification module 670 may be program modules driven by the CPU 221. Although FIG. 6 illustrates that the driver 610, the framework 620, and the force touch identification module 670 are disposed outside the CPU 221, this is for convenience of description, and the technical features of the present invention may not be limited thereto.

According to various embodiments, the driver 610 may receive touch pixel data by a touch input from the touchscreen (or touch IC) 260. For example, the driver 610 may be executed by the CPU 221. The driver 610 may transmit the touch pixel data to the framework 620.

According to various embodiments, the framework 620 may include a reattempt identification module 622 and an area identification module 625. For example, the framework 620 may be executed by the CPU 221. The reattempt identification module 622 may identify whether the touch input is reinputted a designated number of times or more within a designated time. Upon identifying that the touch input is reinputted the designated number of times or more within the designated time, the reattempt identification module 622 may transmit the touch pixel data to the first determination model 630 driven by the CPU 221.

According to various embodiments, if the reattempt identification module 622 does not identify that the touch input is reinputted the designated number of times or more within the designated time, the area identification module 625 may identify the first area where the touch input has been inputted in the display area of the touchscreen 260. The area identification module 625 may identify the number of times of determination and the accuracy of determination in which it is identified before whether the touch input is a force touch in the first area. The area identification module 625 may select the determination model to perform the force touch determination operation among the plurality of determination models 630, 640, and 650 based on the number of times of determination and the accuracy of determination.

According to various embodiments, if the number of times in which it is identified before whether it is a force touch in the first area where the touch input has been identified is less than a designated second number of times, the area identification module 625 may transmit the touch pixel data to the second determination model 640 driven on the CPU 221. If the number of times of determination in which it is identified before whether it is a force touch in the first area where the touch input has been identified is not less than the second number of times, the area identification module 625 may transmit the touch pixel data to the NPU 223 (or the third determination model 650). Or, if the accuracy of determination for the force touch identified before in the first area where the touch input has been identified, the area identification module 625 may transmit the touch pixel data to the first determination model 630 driven on the CPU 221.

According to various embodiments, the CPU 221 or the NPU 223 may determine whether the touch input is a force touch or a long touch through the determination model selected from among the plurality of determination models 630, 640, and 650. Further, the CPU 221 or the NPU 223 may transmit the determination result to the force touch identification module 670.

According to various embodiments, the force touch identification module 670 may perform a function designated for the force touch or long touch based on the determination result. Further, the force touch identification module 670 may store (or update) information about the identification result in the memory (or database) 230. Thereafter, when performing the force touch determination on the touch input identified in the first area, the area identification module 625 may use the identification result information stored in the memory (or database) 230.

Figure 7:
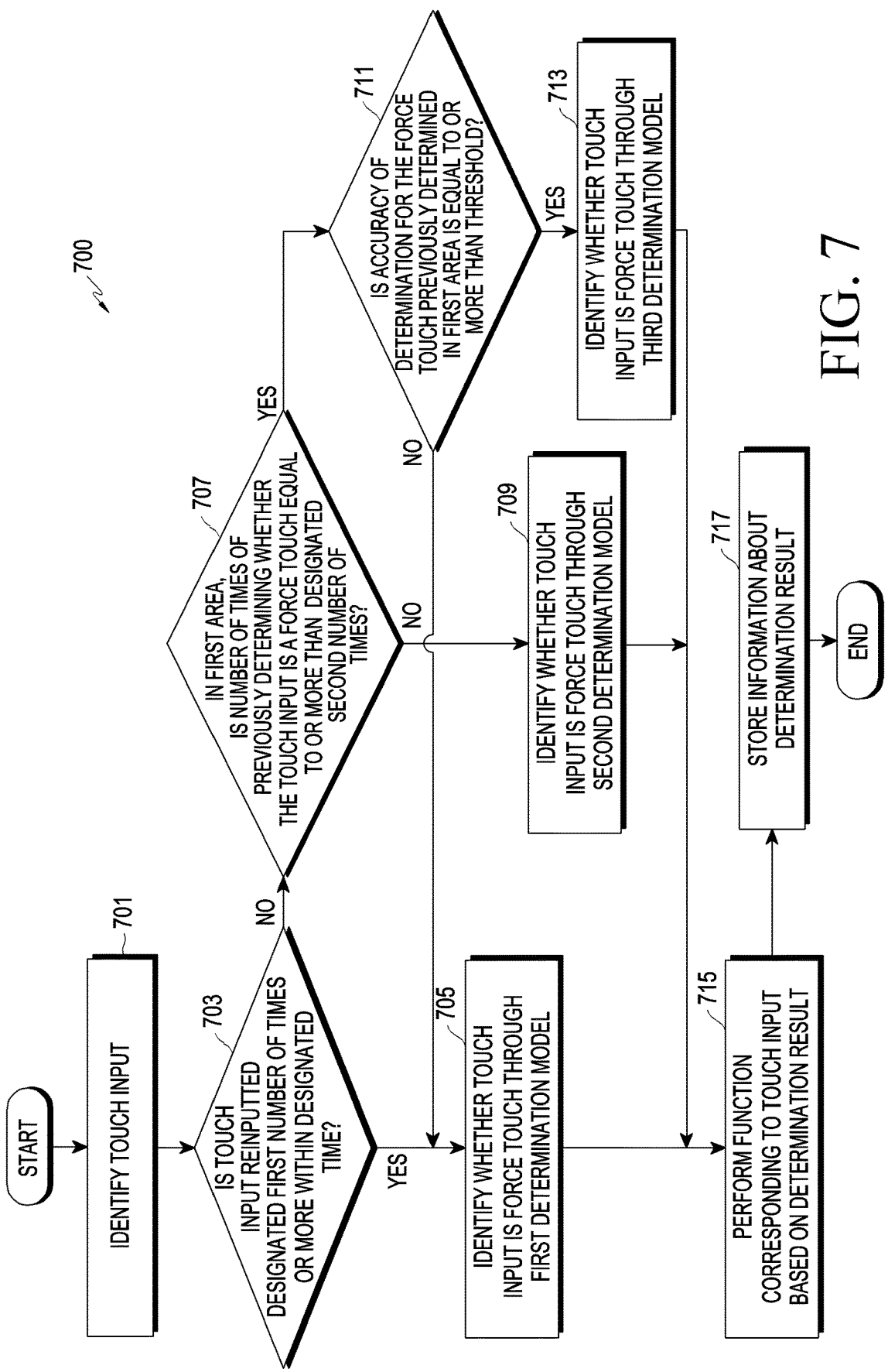
FIG. 7 is a flowchart illustrating an operation of determining a force touch through a deep learning model by an electronic device according to various embodiments.

FIG. 7 is a flowchart 700 illustrating an operation of determining a force touch through a deep learning model by an electronic device according to various embodiments.

Referring to FIG. 7, according to various embodiments, in operation 701, the electronic device 201 may identify the user's touch input through the touchscreen 260. The electronic device 201 may obtain the touch pixel data sensed by the touch input.

According to various embodiments, in operation 703, the electronic device 201 may identify whether the touch input is reinputted a designated first number of times (e.g., twice) or more within a designated time (e.g., 3 seconds).

According to various embodiments, upon identifying that the touch input is reinputted the designated first number of times or more within the designated time (Yes in operation 703), the electronic device 201 may identify whether the touch input is a force touch through the first determination model 630 among the plurality of determination models (or a plurality of deep learning models) in operation 705.

According to various embodiments, if it is not identified that the touch input is reinputted the designated first number of times or more within the designated time (No in operation 703), the electronic device 201 may identify the first area where the touch input has been inputted in the display area of the touchscreen 260. The electronic device 201 may identify the number of times of determination and the accuracy of determination in which it is identified before whether the touch input is a force touch in the first area. In operation 707, the electronic device 201, in the first area where the touch input has been identified, may identify whether the number of times of previously determining whether a touch input is a force touch is equal to or more than a designated second number of times (e.g., 30 times).

According to various embodiments, if the number of times of previously determining whether a touch input is a force touch in the first area where the touch input has been identified is less than the designated second number of times (No in operation 707), the electronic device 201 may identify whether the touch input is a force touch through the second determination model 640 among the plurality of determination models (or the plurality of deep learning models) in operation 709.

According to various embodiments, if the number of times of previously determining whether a touch input is a force touch in the first area where the touch input has been identified is equal to or more than the designated second number of times (Yes in operation 707), the electronic device 201 may identify whether the accuracy of determination for the force touch in the first area where the touch input has been identified is a threshold (e.g., 80%) or more in operation 711.

According to various embodiments, if the accuracy of determination for the force touch previously determined in the first area where the touch input has been identified is equal to or more than the threshold (Yes in operation 711), the electronic device 201 may identify whether the touch input is a force touch through the third determination model 650 among the plurality of determination models (or the plurality of deep learning models) in operation 713. Or, if the accuracy of determination for the force touch previously determined in the first area where the touch input has been identified is less than the threshold (No in operation 711), the electronic device 201 may identify whether the touch input is a force touch through the first determination model among the plurality of determination models (or the plurality of deep learning models) in operation 705.

According to various embodiments, after performing operation 705, 709, or 713, in operation 715, the electronic device 201 may perform a function corresponding to the touch input based on the determination result. For example, upon identifying that the touch input is a force touch, the electronic device 201 may perform the function designated for the force touch. Or, upon identifying that the touch input is a long touch, the electronic device 201 may perform the function designated for the long touch.

According to various embodiments, in operation 717, the electronic device 201 may store (or update) information about the determination result in the memory 230. The electronic device 201 may use the information about the determination result stored in the memory 230 when performing force touch determination on the touch input identified in the first area in the future.

Figure 8:
FIG. 8 is a view illustrating information in a chart about a plurality of deep learning models according to various embodiments.

FIG. 8 is a view illustrating information in a chart 800 about a plurality of deep learning models according to various embodiments.

Referring to FIG. 8, the electronic device 201 may select any one deep learning model (or determination model) from among the plurality of deep learning models (e.g., first determination model 630, second determination model 640, and third determination model 650) for determining whether it is a force touch.

According to various embodiments, the first determination model 630 (e.g., a precise determiner) may be driven on the CPU 221. The first determination model 630 may have a higher computation load (e.g., 1.5 times) than the second determination model 640. The first determination model 630 may have a higher accuracy than the second determination model 640. The first determination model 630 may derive a determination result using floating-point 16-bit (FP16)-type data. For example, if the number of times of having identified before the force touch input in the area where the touch input has been identified is not less than the designated second number of times (e.g., 30 times), and the accuracy of determination is less than the designated accuracy (e.g., 80%), the first determination model 630 may apply. Further, the first determination model 630 may apply even when the touch input requests force touch determination repeatedly within a designated time.

According to various embodiments, the second determination model 640 (e.g., a default determiner) may be driven on the CPU 221. The second determination model 640 may have a lower computation load than the first determination model 630. Further, the second determination model 640 may have a higher computation load than the third determination model 650. The second determination model 640 may have faster responsiveness than the first determination model 630 and higher accuracy than the third determination model 650. The second determination model 640 may derive a determination result using FP16-type data. For example, if the number of times of having identified before the force touch input in the area where the touch input has been identified is less than the designated second number of times, the second determination model 640 may apply.

According to various embodiments, the third determination model 650 (e.g., a fast determiner) may be driven on the NPU 223. However, the third determination model 650 may also be driven on the CPU 221. The third determination model 650 may have a lower computation load (e.g., 0.8 times) than the second determination model 640. Further, the third determination model 650 may have a lower computation load than the second determination model 640. The third determination model 650 may have faster responsiveness than the second determination model 640. The third determination model 650 may derive a determination result using integer 8-bit quantization (INT8)-type data. For example, if the number of times of having identified before the force touch input in the area where the touch input has been identified is not less than the designated second number of times, and the accuracy of determination is not less than the designated accuracy, the third determination model 650 may apply.

Meanwhile, the computation loads, application standards, and data types of the determination models described in connection with FIG. 8 are merely exemplary, and the technical features of the present invention are not limited thereto.

Figure 9:
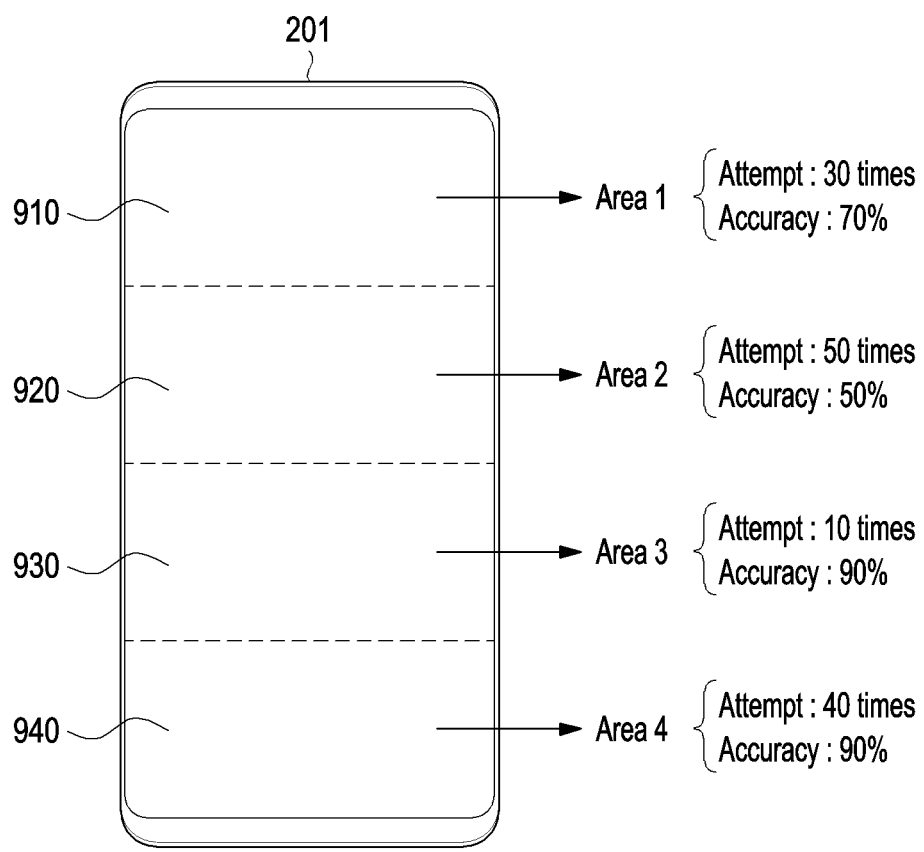
FIG. 9 is a view illustrating an operation of determining a determination model based on a plurality of areas included in a touchscreen by an electronic device according to various embodiments.

FIG. 9 is a view illustrating an operation of determining a determination model based on a plurality of areas included in a touchscreen by an electronic device according to various embodiments.

Referring to FIG. 9, according to various embodiments, the electronic device 201 may divide the display area of the touchscreen 260 into a plurality of areas (e.g., 910 to 940). For example, the electronic device 201 may designate the number, shape, and/or position of the plurality of areas, by the user or automatically by the processor 220. If the user's touch input is inputted through the touchscreen 260, the electronic device 201 may identify the area where the touch input has been inputted among the plurality of areas (e.g., 910 to 940).

According to various embodiments, the electronic device 201 may identify the number of times of determination and the accuracy of determination in which it is identified before whether the touch input is a force touch in the area where the touch input has been identified. For example, the electronic device 201 may use information about the identification result (or determination result) per area, stored in the memory 230. For example, the first area 910 may have determination attempts and a determination accuracy of 70%. The second area 920 may have 50 determination attempts and a determination accuracy of 50%. The third area 930 may have 10 determination attempts and a determination accuracy of 90%. The fourth area 940 may have 40 determination attempts and a determination accuracy of 90%.

Referring to FIGS. 8 and 9, according to various embodiments, if the area where the touch input has been inputted is the first area 910, the electronic device 201 may identify whether the touch input is a force touch through the first determination model 630. If the area where the touch input has been inputted is the second area 920, the electronic device 201 may identify whether the touch input is a force touch through the first determination model 630. If the area where the touch input has been inputted is the third area 930, the electronic device 201 may identify whether the touch input is a force touch through the second determination model 640. If the area where the touch input has been inputted is the fourth area 940, the electronic device 201 may identify whether the touch input is a force touch through the third determination model 650.

Thus, the electronic device 201 may select an efficient deep learning model (or determination model) suitable for the context and perform force touch determination on the user's touch input. Meanwhile, the number, position, and shape of the plurality of areas shown in FIG. 9 and the values for the determination attempt and accuracy are merely exemplary, and the technical spirit of the present invention may not be limited thereto.

Figure 10:
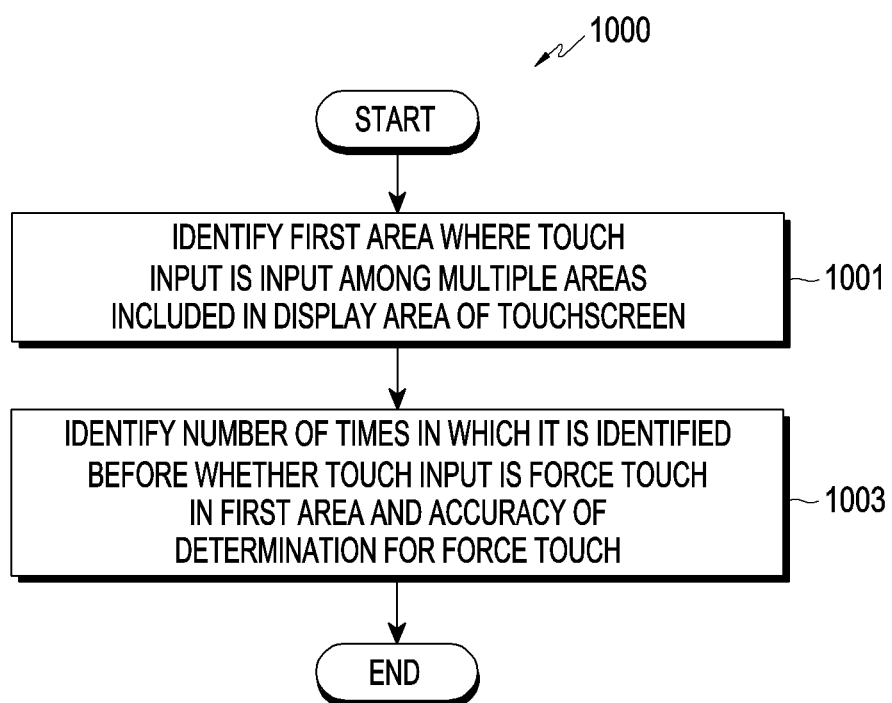
FIG. 10 is a flowchart illustrating an operation of determining a determination model based on a plurality of areas included in a touchscreen by an electronic device according to various embodiments.

FIG. 10 is a flowchart 1000 illustrating an operation of determining a determination model based on a plurality of areas included in a touchscreen by an electronic device according to various embodiments.

Referring to FIG. 10, according to various embodiments, in operation 1001, the electronic device 201 may identify the first area where the touch input has been inputted among the plurality of areas included in the display area of the touchscreen 260. For example, the electronic device 201 may divide the display area of the touchscreen 260 into a plurality of areas. For example, the electronic device 201 may designate the number, position, and/or shape of the plurality of areas, by the user or automatically by the processor 220. For example, the plurality of areas may be set according to the user's usage pattern. For example, the plurality of areas may be set to differ depending on whether the user is a left-handed user or a right-handed user.

According to various embodiments, in operation 1003, the electronic device 201 may identify the number of times of determination in which it is identified before whether it is a force touch in the first area and the accuracy of determination for the force touch. For example, the electronic device 201 may identify the number of times of determination of the force touch and the accuracy of determination of the force touch for the first area using information about the identification result (or determination result) per area, previously stored in the memory 230. The electronic device 201 may determine a deep learning model (or determination model) to perform force touch determination based on the identified number of times of determination and accuracy of determination for the force touch.

According to various embodiments, an electronic device 201 may include a memory 230 configured to store a plurality of deep learning models for determining a force touch, a touchscreen 260, and a processor 220. The processor can be configured to identify a touch input of a user through the touchscreen, receive touch pixel data for a plurality of frames having a time difference based on the touch input, and identify whether the touch input is a force touch based on the touch pixel data. The processor may be configured to identify whether the touch input is reinputted a designated first number of times or more within a designated time, in response to identifying that the touch input is reinputted the designated first number of times or more within the designated time, identify whether the touch input is the force touch using a first determination model 630 among the plurality of deep learning models, and in response to identifying that the touch input is not reinputted the designated first number of times or more within the designated time, identify whether the touch input is the force touch using a determination model having a lower computation load than the first determination model 630 among the plurality of deep learning models.

The processor may be configured to identify that the touch input is a long touch input or a force touch input based on the touch pixel data.

The processor may be configured to, if in response to identifying that the touch input is not reinputted the designated first number of times or more within the designated time, identify whether the touch input is the force touch through a second determination model 640 or a third determination model 650 among the plurality of deep learning models.

The processor may be configured to, in response to identifying that a number of times of determination in which it has previously determined whether the touch input is the force touch in a first area where the touch input is identified among an entire area of the touchscreen is less than a designated second number of times, identify whether the touch input is the force touch through the second determination model having a higher computation load than the third determination model.

The processor may be configured to, in response to identifying that a number of times of determination in which it has previously determined whether the touch input is the force touch in a first area where the touch input is identified among an entire area of the touchscreen is not less than a designated second number of times, identify whether the touch input is the force touch through the third determination model having a lower computation load than the second determination model.

The processor may be configured to, in response to identifying that an accuracy of determination for the force touch previously determined in the first area equal to or more than a threshold, identify whether the touch input is the force touch through the third determination model, and in response to identifying that the accuracy of determination for the force touch previously determined in the first area is less than the threshold, identify whether the touch input is the force touch through the first determination model.

The processor may be configured to drive the first determination model and the second determination model on a first processing unit (e.g., CPU 221) and drive the third determination model on a second processing unit (e.g., NPU 223).

The first determination model and the second determination model may be configured to process first-type data (e.g., FP16). The third determination model may be configured to process second-type data (e.g., INT8) requiring a lower computation load than the first-type data.

The processor may be configured to identify a first area where the touch input is identified among a plurality of areas included in a display area of the touchscreen and identify a number of times that previous determinations were performed of whether the touch input is the force touch in the first area and an accuracy of determination for the force touch.

The processor may be configured to, after identifying whether the touch input is the force touch, store information about a result of the identification in the memory.

According to various embodiments, a method for operating an electronic device 201 may include identifying a touch input of a user through a touchscreen 260 included in the electronic device, receiving touch pixel data for a plurality of frames having a time difference based on the touch input, and identifying whether the touch input is a force touch based on the touch pixel data. Identifying whether the touch input is the force touch may include identifying whether the touch input is reinputted a designated first number of times or more within a designated time, in response to identifying that the touch input is reinputted the designated first number of times or more within the designated time, identifying whether the touch input is the force touch using a first determination model 630 among a plurality of deep learning models stored in a memory 230 included in the electronic device, and in response to identifying that the touch input is not reinputted the designated first number of times or more within the designated time, identifying whether the touch input is the force touch using a determination model having a lower computation load than the first determination model among the plurality of deep learning models.

Identifying whether the touch input is the force touch may include identifying that the touch input is a long touch input or a force touch input based on the touch pixel data.

Identifying whether the touch input is the force touch may include, in response to identifying that the touch input is not reinputted the designated first number of times or more within the designated time, identifying whether the touch input is the force touch through a second determination model 640 or a third determination model 650 among the plurality of deep learning models.

Identifying whether the touch input is the force touch may include, in response to identifying that a number of times that previous determinations were performed of whether the touch input is the force touch in a first area where the touch input is identified of among entire area of the touchscreen is less than a designated second number of times, identifying whether the touch input is the force touch through the second determination model having a higher computation load than the third determination model.

Identifying whether the touch input is the force touch may include, in response to identifying that a number of times that previous determinations were performed of whether the touch input is the force touch in a first area where the touch input is identified among an entire area of the touchscreen is not less than a designated second number of times, identifying whether the touch input is the force touch through the third determination model having a lower computation load than the second determination model.

Identifying whether the touch input is the force touch may include, in response to identifying that an accuracy of determination for the force touch previously determined in the first area equal to or more than a threshold, identifying whether the touch input is the force touch through the third determination model and, in response to identifying that the accuracy of determination for the force touch previously determined in the first area is less than the threshold, identifying whether the touch input is the force touch through the first determination model.

Identifying whether the touch input is the force touch may include driving the first determination model and the second determination model on a first processing unit (e.g., CPU 221) and driving the third determination model on a second processing unit (e.g., NPU 223).

The first determination model and the second determination model may be configured to process first-type data (e.g., FP16). The third determination model may be configured to process second-type data (e.g., INT8) requiring a lower computation load than the first-type data.

The method for operating the electronic device may further include, after identifying whether the touch input is the force touch, storing information about a result of the identification in a memory included in the electronic device.

According to various embodiments, a non-transitory recording medium may store instructions configured to be executed by a processor 220 of an electronic device 201 to enable the electronic device to perform identifying a touch input of a user through a touchscreen 260 included in the electronic device 201, receiving touch pixel data for a plurality of frames having a time difference based on the touch input, and identifying whether the touch input is a force touch based on the touch pixel data. Identifying whether the touch input is the force touch may include identifying whether the touch input is reinputted a designated number of times or more within a designated time, in response to identifying that the touch input is reinputted the designated number of times or more within the designated time, identifying whether the touch input is the force touch using a first determination model 630 among a previously stored plurality of deep learning models, and in response to identifying that the touch input is not reinputted the designated number of times or more within the designated time, identifying whether the touch input is the force touch using a determination model having a lower computation load than the first determination model among the plurality of deep learning models.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a touchscreen;
    at least one processor; and
    a memory storing instructions, that, when executed collectively or individually by the at least one processor, cause the electronic device to:
    identify a touch input of a user through the touchscreen,
    receive touch pixel data for a plurality of frames having a time difference based on the touch input, and
    identify whether the touch input is a force touch based on the touch pixel data,
    wherein the instructions, when executed collectively or individually by the at least one processor, cause the electronic device to,
        identify whether the touch input is reinputted a designated first number of times or more within a designated time,
        in response to identifying that the touch input is reinputted the designated first number of times or more within the designated time, use a first determination model among a plurality of models to identify whether the touch input is a force touch, wherein the plurality of models are pre-trained to identify the force touch, and
        in response to identifying that the touch input is not reinputted the designated first number of times or more within the designated time, use a determination model having a lower computation load than the first determination model among the plurality of models to identify whether the touch input is the force touch.

2. The electronic device of claim 1, wherein the instructions, when executed collectively or individually by the at least one processor, cause the electronic device to, identify that the touch input is a long touch input or a force touch input based on the touch pixel data.

3. The electronic device of claim 1, wherein the instructions, when executed collectively or individually by the at least one processor, cause the electronic device to, in response to identifying that the touch input is not reinputted the designated first number of times or more within the designated time, identify whether the touch input is the force touch through a second determination model or a third determination model among the plurality of models.

4. The electronic device of claim 3, wherein the instructions, when executed collectively or individually by the at least one processor, cause the electronic device to, in response to identifying that a number of times of determination in which it has previously determined whether the touch input is the force touch in a first area where the touch input is identified among an entire area of the touchscreen is less than a designated second number of times, identify whether the touch input is the force touch through the second determination model having a higher computation load than the third determination model.

5. The electronic device of claim 3, wherein the instructions, when executed collectively or individually by the at least one processor, cause the electronic device to, in response to identifying that a number of times of determination in which it has previously determined whether the touch input is the force touch in a first area where the touch input is identified among an entire area of the touchscreen is not less than a designated second number of times, identify whether the touch input is the force touch through the third determination model having a lower computation load than the second determination model.

6. The electronic device of claim 5, wherein the instructions, when executed collectively or individually by the at least one processor, cause the electronic device to:
    in response to identifying that an accuracy of determination for the force touch previously determined in the first area is equal to or more than a threshold, identify whether the touch input is the force touch through the third determination model, and
    in response to identifying that the accuracy of determination for the force touch previously determined in the first area is less than the threshold, identify whether the touch input is the force touch through the first determination model.

7. The electronic device of claim 3, wherein the instructions, when executed collectively or individually by the at least one processor, cause the electronic device to, drive the first determination model and the second determination model on a first processing unit and drive the third determination model on a second processing unit.

8. The electronic device of claim 3, wherein the first determination model and the second determination model are configured to process first-type data, and
wherein the third determination model is configured to process second-type data requiring a lower computation load than the first-type data.

9. The electronic device of claim 1, wherein the instructions, when executed collectively or individually by the at least one processor, cause the electronic device to:
identify a first area where the touch input is identified among a plurality of areas included in a display area of the touchscreen, and
identify a number of times that previous determinations were performed of whether the touch input is the force touch in the first area and an accuracy of determination for the force touch.

10. The electronic device of claim 1, wherein the processor is configured to, after identifying whether the touch input is the force touch, store information about a result of the identification in the memory.

11. A method for operating an electronic device, the method comprising:
identifying a touch input of a user through a touchscreen included in the electronic device;
receiving touch pixel data for a plurality of frames having a time difference based on the touch input; and
identifying whether the touch input is a force touch based on the touch pixel data,
wherein identifying whether the touch input is the force touch comprises,
identifying whether the touch input is reinputted a designated first number of times or more within a designated time;
in response to identifying that the touch input is reinputted the designated first number of times or more within the designated time, using a first determination model among a plurality of models stored in a memory included in the electronic device to identify whether the touch input is the force touch, wherein the plurality of models are pre-trained to identify the force touch; and
in response to identifying that the touch input is not reinputted the designated first number of times or more within the designated time, using a determination model having a lower computation load than the first determination model among the plurality of models to identify whether the touch input is the force touch.

12. The method of claim 11, wherein identifying whether the touch input is the force touch includes identifying that the touch input is a long touch input or a force touch input based on the touch pixel data.

13. The method of claim 11, wherein identifying whether the touch input is the force touch includes, in response to identifying that the touch input is not reinputted the designated first number of times or more within the designated time, identifying whether the touch input is the force touch through a second determination model or a third determination model among the plurality of models.

14. The method of claim 13, wherein identifying whether the touch input is the force touch includes, in response to identifying that a number of times that previous determinations were performed of whether the touch input is the force touch in a first area where the touch input is identified among an entire area of the touchscreen is less than a designated second number of times, identifying whether the touch input is the force touch through the second determination model having a higher computation load than the third determination model.

15. The method of claim 13, wherein identifying whether the touch input is the force touch includes, in response to identifying that a number of times that previous determinations were performed of whether the touch input is the force touch in a first area where the touch input is identified among an entire area of the touchscreen is not less than a designated second number of times, identifying whether the touch input is the force touch through the third determination model having a lower computation load than the second determination model.

16. The method of claim 15, wherein identifying whether the touch input is the force touch includes,
in response to identifying that an accuracy of determination for the force touch previously determined in the first area is equal to or more than a threshold, identifying whether the touch input is the force touch through the third determination model; and
in response to identifying that the accuracy of determination for the force touch previously determined in the first area is less than the threshold, identifying whether the touch input is the force touch through the first determination model.

17. The method of claim 13, wherein identifying whether the touch input is the force touch includes driving the first determination model and the second determination model on a first processing unit and driving the third determination model on a second processing unit.

18. The method of claim 13, wherein the first determination model and the second determination model are configured to process first-type data, and
wherein the third determination model is configured to process second-type data requiring a lower computation load than the first-type data.

19. The method of claim 11, further comprising, after identifying whether the touch input is the force touch, storing information about a result of the identification in a memory included in the electronic device.

20. A non-transitory recording medium storing instructions configured to be executed by a processor of an electronic device to enable the electronic device to perform:
identifying a touch input of a user through a touchscreen included in the electronic device;
receiving touch pixel data for a plurality of frames having a time difference based on the touch input; and
identifying whether the touch input is a force touch based on the touch pixel data,
wherein identifying whether the touch input is the force touch comprises,
identifying whether the touch input is reinputted a designated number of times or more within a designated time;
in response to identifying that the touch input is reinputted the designated number of times or more within the designated time, using a first determination model among a previously stored plurality of models to identify whether the touch input is the force touch, wherein the plurality of models are pre-trained to identify the force touch; and in response to identifying that the touch input is not reinputted the designated number of times or more within the designated time, using a determination model having a lower computation load than the first determination model among the plurality of models to identify whether the touch input is the force touch.

* * * * *